United States Patent [19]

Sandler

[11] 4,114,453

[45] Sep. 19, 1978

[54] ACCELEROMETER SENSOR

[75] Inventor: Benzion Sandler, Beersheba, Israel

[73] Assignee: Ben Gurion University of the Negev Research & Development Authority, Beersheba, Israel

[21] Appl. No.: 806,265

[22] Filed: Jun. 13, 1977

[30] Foreign Application Priority Data

Jun. 13, 1976 [IL] Israel ........................................ 49777

[51] Int. Cl.$^2$ ............................................. G01P 15/12
[52] U.S. Cl. .................................... 73/517 R; 338/43; 338/308
[58] Field of Search ................. 73/517 R; 338/43, 47, 338/93, 99, 100, 300, 308

[56] References Cited

U.S. PATENT DOCUMENTS

| 2,564,416 | 8/1951 | Wildhack ..................... 73/141 AB X |
| 2,963,911 | 12/1960 | Courtney-Pratt et al. ........ 73/517 R |

*Primary Examiner*—Charles A. Ruehl
*Attorney, Agent, or Firm*—Benjamin J. Barish

[57] ABSTRACT

An accelerometer sensor comprises an electrical resistor body disposed within a housing and including compacted interleavings of insulating sheet material coated with electrically-conductive particles imparting to the body a high electrical resistivity in the axial direction, which resistivity decreases with the degree of compaction of the body in the axial direction; and a mass movable within the housing in response to acceleration and effective to apply pressure to the resistor body in the axial direction to further compact same and thereby to decrease its axial resistivity.

10 Claims, 8 Drawing Figures

ACCELEROMETER SENSOR

BACKGROUND OF THE INVENTION

The present invention relates to accelerometer sensors, and particularly to the type including a mass which is displaced in response to acceleration to produce a force which is a measurement of the acceleration.

Many types of accelerometer sensors are presently known, but as a rule they are usually quite costly, relatively heavy, and/or are unduly sensitive to shocks, all of which limit their fields of use.

An object of the present invention is to provide a new form of accelerometer sensor which can be produced at very low cost, of very light weight, and of a high shock resistance.

SUMMARY OF THE PRESENT INVENTION

According to the present invention, there is provided an accelerometer sensor comprising: a housing; an electrical resistor body disposed within the housing and including compacted interleavings of insulating sheet material carrying electrically-conductive particles imparting to said body a high electrical resistivity in the axial direction, which resistivity decreases with the further compaction of said body in the axial direction; a mass movable within the housing in response to acceleration and effective to apply pressure to the resistor body in the axial direction to further compact same and thereby to decrease its axial resistivity; and electrical contacts connected to the opposite ends of said resistor body to enable the axial resistivity thereof to be measured.

In the preferred embodiments of the invention described below, the insulating sheet material is paper, and the electrically-conductive particles are included in a coating on one face thereof.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
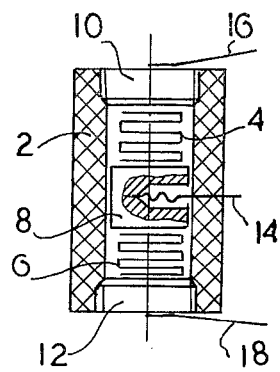
FIG. 1 is a longitudinal sectional view of a two-element accelerometer sensor constructed in accordance with the invention.

FIG. 1 illustrates one form of accelerometer sensor constructed in accordance with the invention. Generally, it comprises a cylindrical plastic housing 2 containing a pair of electrical resistor bodies 4, 6, and a mass 8, the ends of the housing being closed by threaded end caps 10, 12. The sensor includes three electrical terminals, namely terminal 14 connected, via mass 8, to the inner ends of the two electrical resistor bodies 4, 6; and terminals 16, 18 connected, via the housing end caps 10, 12, to the outer ends of the two resistor bodies. Mass 8 is preferably of electrically conductive material, for example copper, so that terminal 14 need be connected only to it, as by soldering, connector 14 passing through the wall of housing 2 via an elongated opening (not shown). In addition, the housing end caps 10, 12 are also preferably made of good electrically-conductive material, for example copper, so that terminal 16 and 18 may be connected directly to them as by soldering.

Figure 2:
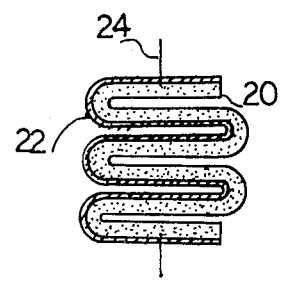
FIG. 2 illustrates the construction of each of the two electrical resistor bodies in the accelerometer sensor of FIG. 1.

FIG. 2 illustrates more particularly the construction of each of the electrical resistor bodies 4, 6 in the accelerometer sensor of FIG. 1. The resistor body in FIG. 2 is constituted of a strip of insulating sheet material 20, preferably paper, carrying electrically conductive particles in the form of a coating 22 on one face of the strip, the strip being formed with a plurality of transverse folds to provide a plurality of compacted interleavings. The electrically-conductive particles in the coating 22 impart to the resistor body a high electrical resistivity in the axial direction, indicated by axis 24 in FIG. 2. It will be appreciated that this axial resistivity of the electrical resistor body varies with the degree of compaction of the body in the axial direction since a higher degree of compaction increases the surface area contacts of the conductive particles in coating 22.

The second electrical resistor body 6 is of the same construction as body 4 and is disposed in the opposite end of housing 2 in alignment with body 4 along axis 24. The outer end of resistor body 4 bears against the housing end cap 10, and the outer end of resistor body 6 bears against end cap 12.

Mass 8 is disposed between the two resistor bodies 4 and 6. Preferably, it is of cylindrical shape, its opposite ends being flat and in contact with the inner ends of the two bodies 4 and 6. Mass 8 is movable within the housing along axis 24 in response to acceleration, and is effective to apply pressure to the resistor bodies 4 and 6 in the direction of axis 24, to increase or decrease the compaction of the respective resistor bodies, and thereby to decrease or increase their respective axial resistivities.

The resistivities of resistor bodies 4 and 6 in the axial direction may be measured by a measuring circuit connected to terminals 14, 16 and 18. A conventional bridge circuit may be used, such as described below with respect to FIG. 8, in which the two resistor bodies 4 and 6 constitute two legs of the bridge, the remaining two legs being constituted by reference resistors.

One (or both) of the housing end caps 10, 12 may be threaded into their respective ends of the housing 2 so as to preset the degree of compaction of the resistor bodies 4, 6, and thereby to preset the sensitivity of the device.

As one example, housing 2 may have an inner diameter of 10 mm; mass 8 may be of copper and of a weight of 15 grams; and each of the resistor bodies 4, 6 may be made of a strip of carbon-conductive paper, such as "Teldeltos Paper" sold by Servomex Control Ltd., of Crowborough, Sussex, England, having a width of 5 mm and a length of 15 cm. Such a strip may be folded and initially compacted as shown to have an axial resistivity of 70 kilohms; when an acceleration of 2 "G's" is applied, mass 8 is effective to further compact each resistor body such that its axial resistivity decreases to about 35 kilohms.

An accelerometer sensor can be constructed as described above at extremely low cost, estimated to be as low as about 2-5% the cost of currently available piezoelectric accelerometer sensors. Moreover, the sensor can be constructed of extremely low weight, for example as low as 5 grams or even less. In addition, such accelerometer sensors are of sturdy construction, have high shock resistance and low sensitivity to impact; e.g., they are not affected when dropped on a hard floor, which would destroy piezoelectric sensors in many cases. Further, the novel sensors are capable of producing relatively high outputs which can drive recorders and oscillographs directly without pre-amplifiers.

Figures 3, 4:
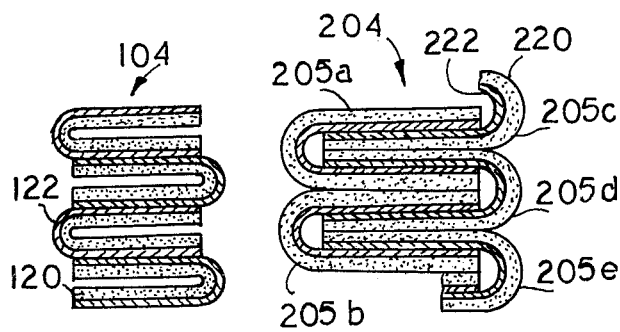
FIGS. 3-5 illustrate alternative constructions that may be used for making each of the electrical resistor bodies in the accelerometer sensor of FIG. 1.

FIG. 3 illustrates an alternative construction that may be used for the electrical resistor bodies 4 and 6 in the accelerometer sensor of FIGS. 1 and 2. In FIG. 3, each of the resistor bodies, therein designated 104, includes a plurality of strips each of thin insulating paper sheet 120 coated on one face with a layer 122 of electrically-conductive material, such as particles of carbon. Each of the strips is folded in a U-shape, and a plurality of the strips are then stacked to form a compacted interleaved electrical resistor body having high electrical resistivity in the axial direction, as described above with respect to body 4 in FIG. 2, the electrically conductive particles (e.g. carbon) in coatings 122 imparting to the body a high electrical resistivity in the axial direction which resistivity decreases with the further compaction of the body in the axial direction.

FIG. 4 illustrates a further variation that may be used in the construction of each of the electrical resistor bodies in the accelerometer sensor of FIG. 1.

In FIG. 4, the electrical resistor body, generally designated 204, is made of a plurality of small strips 205a–205e each of thin insulating paper 220 having a coating 222 of conductive particles, for example carbon as described above. Each of the small strips 205a–205e is folded on itself into a U-shape, and the two legs of each folded strip are separated by, and interleaved with, the legs of the adjacent strips. This arrangement also produces an interleaved electrical resistor body of high electrical resistivity in the axial direction which resistivity decreases with the compaction of the body in the axial direction.

Figure 5:
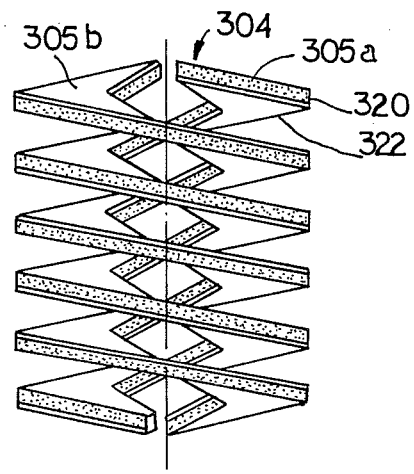

FIG. 5 illustrates a further construction which may be used for each of the electrical resistor bodies in the accelerometer sensor of FIG. 1. The electrical resistor body in FIG. 5, generally designated 304, is constituted of two strips 305a, 305b, each cut in the form of an open spiral, the two spirals being interleaved with each other. Each of the strips 305a, 305b is formed with the same material as described above, namely a layer of insulating paper 320 having a coating 322 on one face of electrically-conductive particles such as carbon. The two interleaved spiral strips are compacted when placed into the accelerometer sensor housing (2, FIG. 1) so as to produce the same type of interleaved electrical resistor body as described above, namely one having high electrical resistivity in the axial direction which resistivity decreases with the further compaction of the body (by mass 8, FIG. 1) in the axial direction.

Figure 6:
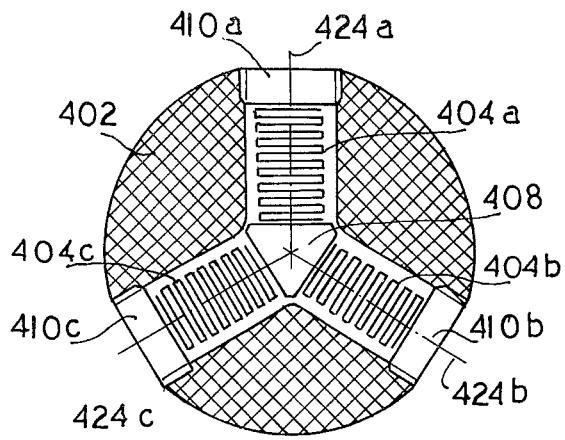
FIG. 6 illustrates a three-body accelerometer sensor constructed in accordance with the invention.

FIG. 6 illustrates another construction that may be used for the accelerometer sensor. In this construction, the sensor housing 402 is provided with three bores for accommodating three electrical resistor bodies 404a, 404b, and 404c, disposed along axes 424a, 424b, 424c, respectively, spaced from each other 120° and intersecting each other at the centre of the housing. The mass 408 is disposed at the centre of the housing, is of triangular shape, and has three flat surfaces for engagement with the inner ends of the three resistor bodies. The outer ends of the resistor bodies are engaged by housing end caps 410a, 410b, 410c, respectively, all of which are preferably threaded into the outer ends of the housing to permit presetting the degree of compaction of the respective electrical resistor bodies 404a, 404b, and 404c.

It will be seen that the change in the electrical resistivity of bodies 404a–404c, in response to their compaction by mass 408 during acceleration, will be a vectorial measurement of acceleration along the three axes 424a, 424b, 424c, respectively.

Figure 7:
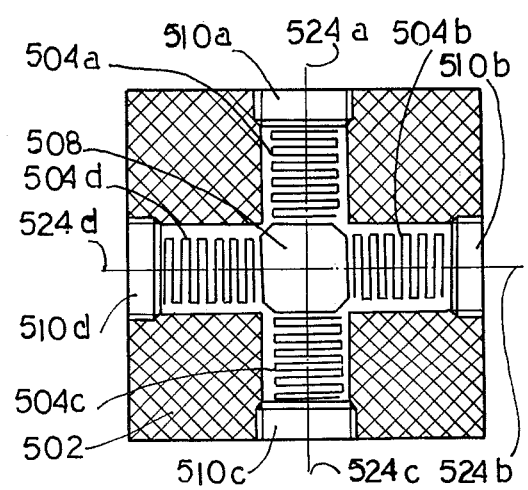
FIG. 7 illustrates a four-body accelerometer sensor constructed in accordance with the invention.

FIG. 7 illustrates a four-element sensor also for use in vectorially measuring acceleration. The sensor in FIG. 7 includes a housing 502 formed with two right-angle bores intersecting each other at the centre of the housing. Two electrical resistor bodies 504a, 504c are disposed at the opposite ends of one of the bores, and two further electrical resistor bodies 504b and 504d are disposed at the opposite ends of the other bore. The mass 508 is located at the centre of the housing and is provided with four flat faces to engage the inner ends of the four resistor bodies. The outer ends of the resistor bodies are engaged by the threaded end caps 510a–510d, respectively.

Figure 8:
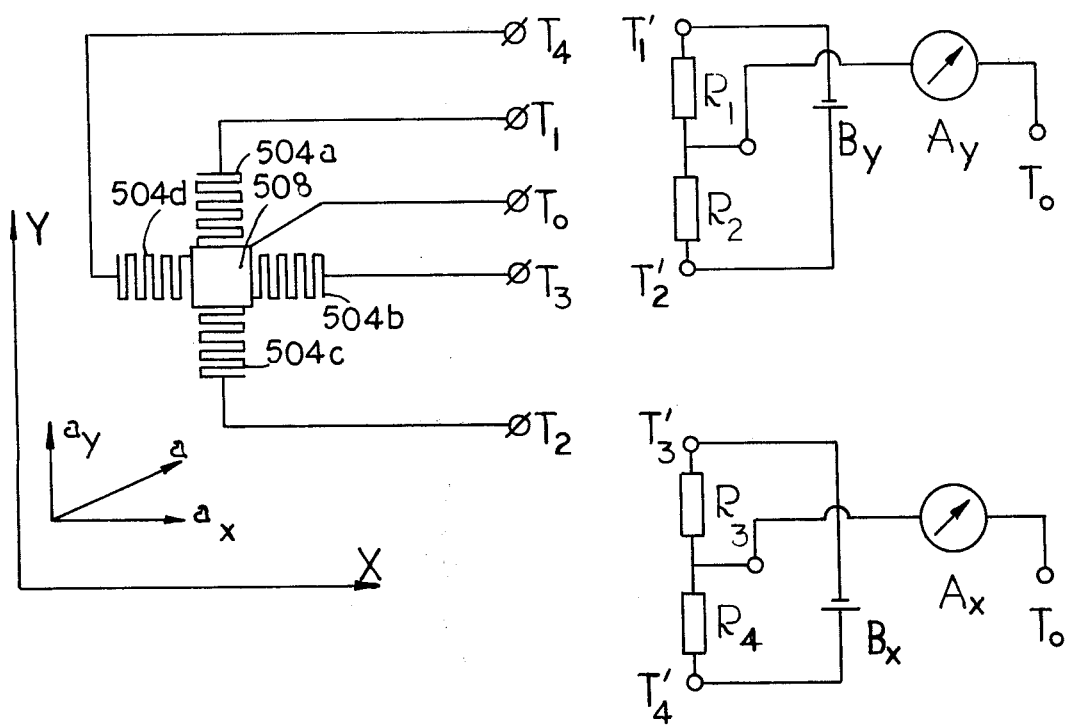
FIG. 8 illustrates a complete accelerometer including a measuring system and the accelerometer sensor of FIG. 7.

FIG. 8 illustrates how the accelerometer sensor of FIG. 7 may be used for producing a vectorial measurement of acceleration (vector $a$), namely by producing a reading of its component $a_x$ along the X-axis, and its component $a_y$ along the Y-axis.

Thus, electrical terminal To is connected to the mass 508 and thereby (since the mass is of copper) to the inner ends of the four electrical resistor bodies 504a–504d; and terminals $T_1$–$T_4$, respectively, are connected to the opposite (outer) ends of the resistor bodies. Terminals $T_1$ and $T_2$ are adapted to be connected to the correspondingly numbered terminals $T_1'$, $T_2'$ of a measuring circuit to form a bridge in which two legs are constituted of resistor bodies 504a and 504c in the accelerometer sensor, and the remaining two legs are constituted of reference resistors $R_1$, $R_2$. This bridge circuit is powered by battery $B_y$, and its output is indicated by meter $A_y$. Similarly, terminals $T_3$, $T_4$, and To are adapted to be connected to correspondly-number terminals $T_3'$, $T_4'$, To' in a second measuring circuit to form a second bridge in which two legs are constituted of resistor bodies 504b, 505d in the accelerometer sensor, and the other two legs are constituted of reference resistors $R_3$, $R_4$, this second bridge circuit being powered by battery $B_x$, and its output being indicated by meter $A_x$. It will thus be seen that the reading of meter $A_x$ will be a measurement of the acceleration (vector $a$) along the X-axis ($a_x$), and the reading of meter $A_y$ will be a measurement of the acceleration (vector $a$) along the Y-axis ($a_y$).

While the above-described carbon-conductive paper has been found particularly suitable for use in making the resistor bodies in the accelerometer sensors described above, it will be appreciated that other material could be used, for example paper or fabric coated with other conductive particles, e.g. aluminum flake, or copper particles. In addition, other interleaving arrangements could be used to provide a resistor body whose resistivity in the axial direction varies with the degree of compaction of the body in that direction.

Many other variations, modifications and applications of the illustrated embodiments will be apparent.

What is claimed is:

1. An acceleration sensor, comprising:
   a housing;
   an electrical resistor body disposed within the housing and including compacted interleavings of insulating sheet material carrying electrically-conductive particles imparting to said body a high electrical resistivity in the axial direction, which resistivity decreases with the further compaction of said body in the axial direction;
   a mass movable within the housing in response to acceleration and effective to apply pressure to the resistor body in the axial direction to further compact same and thereby to decrease its axial resistivity;
   and electrical contacts connected to the opposite ends of said resistor body to enable the axial resistivity thereof to be measured.

2. A sensor according to claim 1, wherein said electrically-conductive particles are carried in a coating on one face of the insulating sheet material.

3. A sensor according to claim 2, wherein said insulating sheet material is paper, and said electrically-conductive particles are carbon.

4. A sensor according to claim 1, wherein said electrical resistor body includes at least one strip of said insulating sheet material provided with at least one transverse fold to produce said interleavings.

5. A sensor according to claim 1, wherein said electrical resistor body includes a spiral strip of said insulating sheet material the spirals being closed in the axial direction to form said interleavings.

6. A sensor according to claim 1, further including a presettable element engageable with the outer end of the electrical resistor body for presetting the compaction thereof between said element and said mass.

7. A sensor according to claim 1, wherein said housing includes a pair of said electrical resistor bodies aligned along a common axis with the mass disposed between them and contacting their respective inner ends.

8. A sensor according to claim 1, wherein said housing includes three of said electrical resistor bodies disposed along axes spaced 120° from each other and intersecting at the centre of the housing, said mass being disposed at said centre in contact with the inner ends of the three bodies.

9. A sensor according to claim 1, wherein said housing includes four of said electrical resistor bodies, there being two bodies aligned with each other along a first axis, and two bodies aligned with each other along a second axis intersecting said first axis at the centre of said housing, said mass being disposed at said centre in contact with the inner ends of all four bodies.

10. An accelerometer including a sensor according to claim 1 in combination with an electrical circuit for measuring the axial resistivity of said resistor body and for indicating same as a function of acceleration.

* * * * *